US011669956B2

(12) United States Patent
Mianzo et al.

(10) Patent No.: US 11,669,956 B2
(45) Date of Patent: Jun. 6, 2023

(54) GROUND ENGAGING TOOL WEAR AND LOSS DETECTION SYSTEM AND METHOD

(71) Applicant: Caterpillar Inc., Peoria, IL (US)

(72) Inventors: Lawrence A Mianzo, Pittsburgh, PA (US); Tod A Oblak, Pittsburgh, PA (US); John M Plouzek, Peoria, IL (US); Raymond Alan Wise, Metamora, IL (US); Shawn Nainan Mathew, Savoy, IL (US)

(73) Assignee: Caterpillar Inc., Peoria, IL (US)

( * ) Notice: Subject to any disclaimer, the term of this patent is extended or adjusted under 35 U.S.C. 154(b) by 46 days.

(21) Appl. No.: 17/335,835

(22) Filed: Jun. 1, 2021

(65) Prior Publication Data
US 2022/0383469 A1 Dec. 1, 2022

(51) Int. Cl.
| | | |
|---|---|---|
| *G06T 7/00* | (2017.01) | |
| *G06T 7/521* | (2017.01) | |
| *G06T 7/11* | (2017.01) | |
| *G06T 7/174* | (2017.01) | |
| *G06V 10/44* | (2022.01) | |
| *G06V 20/64* | (2022.01) | |

(52) U.S. Cl.
CPC ............... *G06T 7/001* (2013.01); *G06T 7/11* (2017.01); *G06T 7/174* (2017.01); *G06T 7/521* (2017.01); *G06V 10/44* (2022.01); *G06V 20/647* (2022.01); *G06T 2207/10012* (2013.01); *G06T 2207/10028* (2013.01); *G06T 2207/30164* (2013.01)

(58) Field of Classification Search
CPC . G06T 7/001; G06T 7/521; G06T 7/11; G06T 7/174; G06T 2207/10012; G06T 2207/10028; G06T 2207/30164; G06V 10/44; G06V 20/647
See application file for complete search history.

(56) References Cited

U.S. PATENT DOCUMENTS

| | | | |
|---|---|---|---|
| 8,411,930 B2 | 4/2013 | Ridley et al. | |
| 9,670,649 B2 | 6/2017 | Bewley et al. | |
| 9,886,754 B2 | 2/2018 | Lim et al. | |
| 10,074,191 B1* | 9/2018 | Reome | ................ G01S 17/87 |
| 10,249,060 B2 | 4/2019 | Wagner et al. | |
| 10,339,667 B2 | 7/2019 | Tafazoli Bilandi et al. | |

(Continued)

FOREIGN PATENT DOCUMENTS

| | | |
|---|---|---|
| CN | 106592679 A | 4/2017 |
| CN | 107862675 A | 3/2018 |

(Continued)

*Primary Examiner* — Gregory M Desire
(74) *Attorney, Agent, or Firm* — Lee & Hayes

(57) ABSTRACT

An example wear detection system receives first imaging data from one or more sensors associated with a work machine. The first imaging data comprises data related to at least one ground engaging tool (GET) of the work machine. The example system identifies a region of interest including data of the at least one GET within the first imaging data. Based on the identified region of interest, the example system controls a LiDAR sensor to capture second imaging data capturing the at least one GET that is of higher resolution than the first imaging data. The example system generates a three-dimensional point cloud of the at least one GET based on the second imaging data and determines a wear level or loss for the at least one GET based on the three-dimensional point cloud.

20 Claims, 9 Drawing Sheets

(56) References Cited

U.S. PATENT DOCUMENTS

| | | |
|---|---|---|
| 10,504,072 B2 | 12/2019 | Restum et al. |
| 10,650,538 B2 * | 5/2020 | Ferrari ................... G06V 10/50 |
| 10,783,610 B2 * | 9/2020 | Tafazoli Bilandi .. G06V 10/764 |
| 10,929,820 B2 | 2/2021 | Restum et al. |
| 11,060,853 B2 * | 7/2021 | Zheng ....................... G06T 7/97 |
| 11,120,577 B2 * | 9/2021 | Sugawara ............... E02F 9/264 |
| 2015/0085123 A1 | 3/2015 | Tafazoli Bilandi et al. |
| 2016/0237640 A1 * | 8/2016 | Carpenter ................. E02F 9/26 |
| 2017/0051474 A1 | 2/2017 | Finch et al. |
| 2017/0103506 A1 | 4/2017 | Dandibhotla |
| 2017/0352199 A1 | 12/2017 | Finley et al. |
| 2018/0106019 A1 | 4/2018 | Bewley et al. |
| 2018/0130222 A1 | 5/2018 | Tafazoli et al. |
| 2020/0362539 A1 | 11/2020 | Plouzek et al. |
| 2020/0363203 A1 | 11/2020 | Plouzek et al. |
| 2020/0393303 A1 | 12/2020 | Betournay et al. |
| 2021/0042907 A1 | 2/2021 | Campomanes et al. |

FOREIGN PATENT DOCUMENTS

| | | |
|---|---|---|
| WO | WO20190227194 A1 | 12/2019 |
| WO | WO20200237324 A1 | 12/2020 |
| WO | WO20210041988 A1 | 3/2021 |

\* cited by examiner

GROUND ENGAGING TOOL WEAR AND LOSS DETECTION SYSTEM AND METHOD

TECHNICAL FIELD

The present disclosure relates to a system and method for detecting wear of objects over time, and more particularly, to a system and method for detecting wear in, or loss of, one or more ground engaging tools (GET) over time using imaging techniques.

BACKGROUND

Machines may be used to perform variety of tasks at a worksite. For example, machines may be used to excavate, move, shape, contour, and/or remove material present at the worksite, such as gravel, concrete, asphalt, soil, and/or other materials. These machines can include a bucket used to collect such materials, and the bucket can include a set of GET, such as teeth, to loosen the material. GET can also include shrouds attached to the bucket between teeth to protect the edge of the bucket. Over time, the GET wear and diminish in size reducing their effectiveness making it more difficult for the bucket to collect worksite material. GET can also break from the bucket. When a GET break goes undetected, the GET can mix with the worksite material and can cause damage to downstream processing equipment such as crushers or pulverizers. Work machines may utilize wear detection systems to identify worn or broken GET before damage to downstream equipment occurs.

An attempt to provide a wear detection system is described in U.S. Pat. App. Pub. No. 2016/0237640 ("the '640 Publication"), published Aug. 18, 2016. The '640 Publication describes a system and tool for monitoring ground-engaging products for earth working equipment that monitors characteristics of those products such as part identification, presence, condition, usage, and/or performance. While the monitoring tool of the '640 Publication can include a light detection and ranging ("LiDAR") sensor, the disclosed LiDAR sensor are static and do not employ adaptive scanning technology that allows for scanning of objections with differing fields of view or resolution. Moreover, the monitoring tools described in the '640 Publication merely offer coarse object detection with accuracy and precision of no better than approximately two centimeters.

Reliance on low-resolution and non-adaptive scanning LiDAR sensors presents disadvantages for detecting wear in GET. First, resolution of approximately two centimeters does provide effective or precise measurement of GET as measurements on the order of magnitude of millimeters (or lower) is preferred. Moreover, non-adaptive scanning LiDAR requires the LiDAR sensor to maintain a fixed field of view, preventing adjustment of image capture and/or change in resolution of captured image information. As a result, the system described in the '640 Publication can be prone to errors in detecting GET wear or loss and is unable to provide measurements at a desirable level of precision. The systems and methods described herein are directed to addressing one or more of these concerns.

SUMMARY

According to a first aspect, a method for detecting wear or loss of a GET includes receiving first imaging data from one or more sensors associated with a work machine. The first imaging data comprises data related to at least one GET of the work machine. The first imaging data identifying the at least one GET at a first resolution. The method identifies a region of interest within the first imaging data that includes the data related to the at least one GET. The method controls a LiDAR sensor to capture second imaging data corresponding to the identified region of interest. The second imaging data identifies the at least one GET at a second resolution higher than the first resolution. The method generates a three-dimensional point cloud of the at least one GET based on the second imaging data and determines a wear level or loss for the at least one GET based on the three-dimensional point cloud.

According to a further aspect, a GET wear detection system includes one or more sensors associated with a work machine, one or more processors, and non-transitory computer readable media storing executable instructions. At least one of the one or more sensors is a LiDAR sensor. The executable instructions when executed by the processor cause the processor to perform operations including receiving first imaging data from the one or more sensors. The first imaging data comprises data related to at least one GET of the work machine. The first imaging data identifies the GET at a first resolution. The operations also include identifying a region of interest within the first imaging data including the data related to the at least one GET and controlling the LiDAR sensor to capture second imaging data corresponding to the identified region of interest at a second resolution that is higher than the first resolution. The operations also include generating a three-dimensional point cloud of the at least one GET based on the second imaging data and determining a wear level or loss for the at least one GET based on the three-dimensional point cloud.

According to another aspect, a work machine includes a bucket comprising at least one GET, a stereoscopic camera comprising a left image sensor and a right image sensor, a LiDAR sensor, one or more processors, and non-transitory computer readable media storing executable instructions that when executed by the one or more processors cause the one or more processors to perform operations. The operations include receiving a left image of the at least one GET captured by the left image sensor and receiving a right image of the at least one GET captured by the right image sensor. The operations also include generating a dense stereo disparity map based on the left image and the right image and identifying a region of interest based on the dense stereo disparity map. The operations further include controlling the LiDAR sensor to capture imaging data based on the identified region of interest. The imaging data captures the at least one GET at a resolution higher than either the left image or the right image. The operations further include generating a three-dimensional point cloud of the at least one GET based on the imaging data and determining a wear level or loss for the at least one GET based on the three-dimensional point cloud.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

The present disclosure is generally directed to systems and methods for detecting wear of components of a work machine in an environment, such as a worksite, using one or more sensors. The one or more sensors can include imaging sensors (that could be part of a stereoscopic camera or "stereo camera") and LiDAR sensors capable of capturing imaging data associated with the components. The imaging data can include, but is not limited to, video, images, or LiDAR imaging data. The imaging data is analyzed by a wear detection computer system associated with the work machine—aspects of which may be disposed on the work machine, within the stereo camera, within the LiDAR sensor, or external to these components—to detect wear of the component. The component can be one or more GET of a bucket of the work machine, as one example. The wear detection computer system analyzes the imaging data in one or more phases. In an example first phase, the wear detection computer system receives lower resolution imaging data and uses it to detect a region of interest that includes the analyzed components (e.g., GET). in an example second phase, the wear detection computer system uses the location of the region of interest to control a LiDAR sensor to capture a higher-resolution LiDAR imaging data of the analyzed components. A three-dimensional point cloud of the higher-resolution imaging data is analyzed to determine a wear level or loss of the analyzed components. Using this technique, the wear detection computer system can direct the LiDAR sensor to capture images of the analyzed components at millimeter level of precision (e.g., the LiDAR sensor receives a data "hit" about every 1-2 mm).

Figure 1:
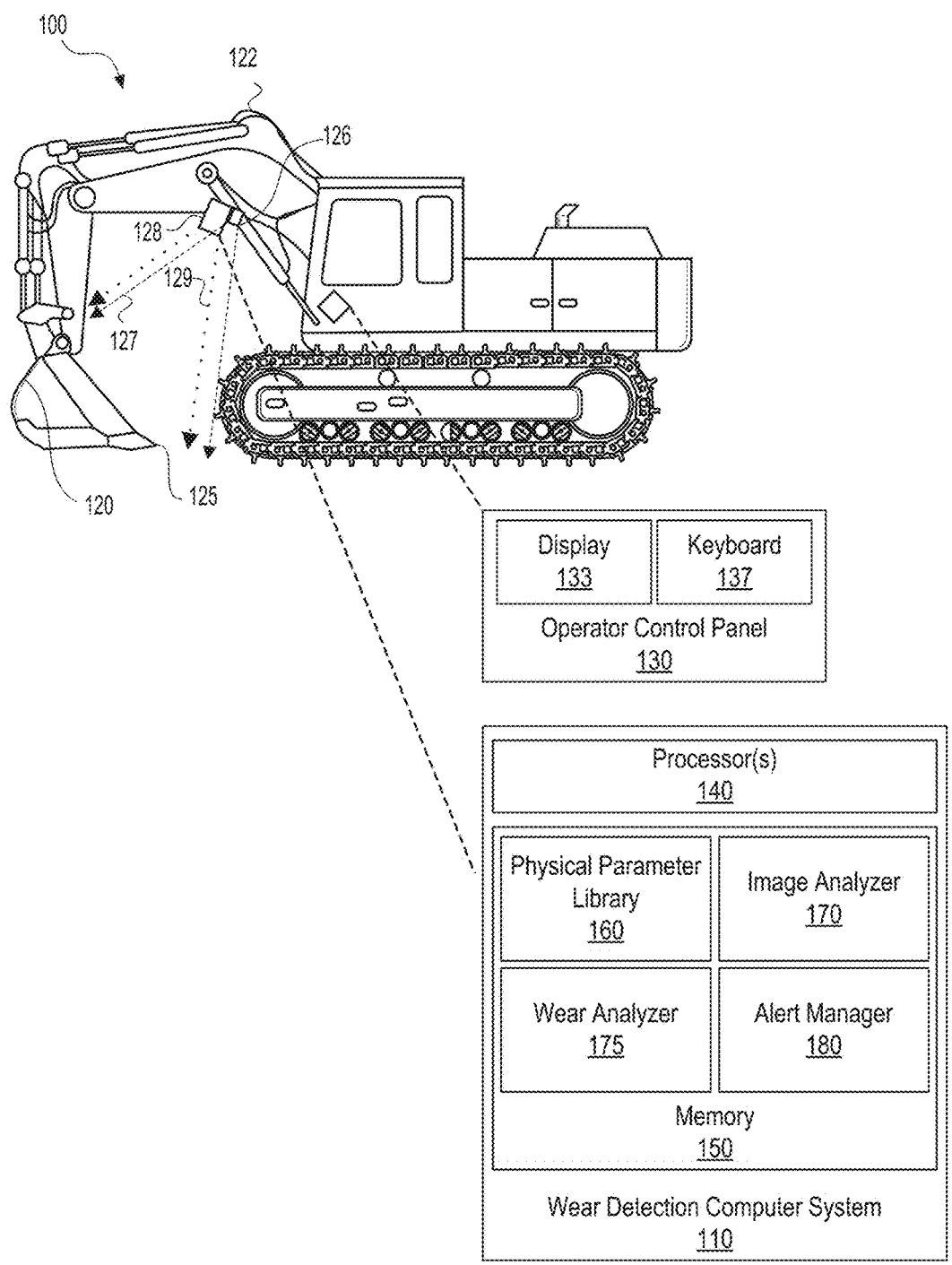
FIG. 1 is a block diagram depicting a schematic view of an example machine including an example system for detecting wear in GET.

FIG. 1 is a block diagram depicting a schematic of an example work machine 100 including an example wear detection computer system 110. While FIG. 1 depicts work machine 100 as a hydraulic mining shovel, in other examples, work machine 100 can include any machine that moves, sculpts, digs, or removes material such as soil, rock, or minerals. As shown in FIG. 1, work machine 100 can include a bucket 120 attached to arm 122. Bucket 120 can include one or more ground engaging tools (GET) 125, such as teeth, that assist work machine 100 in loosening material. While the examples provided in this disclosure typically refer to GET 125 as teeth, other types of GET are contemplated to be within the scope of the embodiments provided by this disclosure. For example, GET can include lip shrouds, edge guards, adapters, ripper protectors, cutting edges, sidebar protectors, tips, or any other tool associated with a work machine that wear over time due to friction with worksite material.

Work machine 100 can also include one or more sensors having respective fields of view such as LiDAR sensor 126 having field-of-view 127 and stereo camera 128 having field-of-view 129. Both field-of-view 127 and field-of-view 129 are directed to bucket 120 and GET 125. As shown in FIG. 1, field-of-view 127 and field-of-view 129 are substantially overlapping.

LiDAR sensor 126 can include an adaptive scanning LiDAR sensor, i.e., a LiDAR sensor for which its resolution and field of view can be commanded, controlled, and configured. For example, LiDAR sensor 126 can include an AEYE 4Sight M™. In some embodiments, field-of-view 127 starts with a baseline of 60 degrees by 30 degrees (representing a "low" resolution range scan) which can then be adjusted by 0.1 degrees to high definition region of interest spanning 0.025 degrees, but other fields of view and angular resolutions may be present in other embodiments. LiDAR sensor 126 can be configured to collect as many as 1,600 points per square degree at a frequency of 100 Hz. The precision of LiDAR sensor 126 is a function of the angular resolution of field-of-view 127 and the distance between LiDAR sensor 126 and GET 125. As an example, when GET 125 is approximately six meters from LiDAR sensor 126 and field-of-view 127 is configured as 60 degrees by 30 degrees, a 1,600 points-per-square degree scan would yield LiDAR hits within an captured rectangle of approximately 7.2 meters by 3.2 meters. By refocusing the field of view, a LiDAR hit can register 2.6 millimeters in the horizontal and vertical directions. While the above describes one example LiDAR sensor 126, different LiDAR sensors capable of adaptive scanning can be used in various embodiments.

Stereo camera 128 includes a left image sensor and a right image sensor that are spaced apart as to capture a stereo image of objects within field-of-view 129, such as bucket 120 and GET 125. In some embodiments, the left image sensor and the right image sensor capture monochromatic images. Stereo camera 128 can also include a color image sensor to capture color images of objects within field-of-view 129. In some embodiments, camera 128 outputs digital images or work machine 100 may include an analog to digital converter disposed between camera 128 and wear detection computer system 110 to covert analog images to digital images before they are received by wear detection computer system 110.

The one or more sensors of work machine 100, such as LiDAR sensor 126 and camera 128, can include a lens cleaning device to remove debris, fog, or other obstructions from the surface (or screen) of the lenses of the one or more sensors in some embodiments. The lens cleaning device can include, for example, a nozzle for emitting compressed air, washer solvent, or washer antifreeze solvent. The lens cleaning device can also include a moving wiper that is configured to contact and wipe the surface of the lens to push debris or other obstructions away from the lens surface. In some embodiments, the cover of the lenses of the one or more sensors may include an actuator that rotates the lens screen (for cylindrical lens screens) or slides the lens screen (for flat lens screens) so that it contacts one or more wipers to remove debris from the screen.

As work machine 100 operates within a worksite, it may move arm 122 to position bucket 120 to move or dig material within the worksite as part of a dig-dump cycle. As work machine 100 positions bucket 120 through the dig-dump cycle, bucket 120 may move in and out of field-ofview 127 and field-of-view 129. LiDAR sensor 126 and camera 128 may be positioned so that they have an unobstructed view of GET 125 during the dig-dump cycle. For example, LiDAR sensor 126 and camera 128 may be positioned on work machine 100 so that bucket 120 and GET 125 are visible at the moment bucket 120 empties material within the dig-dump cycle. As another example, LiDAR sensor 126 and camera 128 may be positioned so that bucket 120 enters its field-of-view when arm 122 is fully extended or fully contracted within the dig-dump cycle. As explained below with respect to FIGS. 2-4, the position of LiDAR sensor 126 and camera 128 (and accordingly field-of-view 127 and field-of-view 129) may vary depending on the type of work machine 100 and specifics related to its worksite.

According to some embodiments, work machine 100 includes an operator control panel 130. Operator control panel 130 can include a display 133 which produces output for an operator of work machine 100 so that the operator can receive status or alarms related to wear detection computer system 110. Display 133 can include a liquid crystal display (LCD), a light emitting diode display (LED), cathode ray tube (CRT) display, or other type of display known in the art. In some examples, display 133 includes audio output such as speakers or ports for headphones or peripheral speakers. Display 133 can also include audio input devices such as microphone or ports for peripheral microphones. Display 133 includes a touch-sensitive display screen in some embodiments, which also acts as an input device.

In some embodiments, operator control panel 130 also includes a keyboard 137. Keyboard 137 provides input capability to wear detection computer system 110. Keyboard 137 includes a plurality of keys allowing the operator of work machine 100 to provide input to wear detection computer system 110. For example, an operator may depress the keys of keyboard 137 to select or enter the type of work machine 100, bucket 120, and/or GET 125 according to examples of the present disclosure. Keyboard 137 can be non-virtual (e.g., containing physically depressible keys) or keyboard 137 can be a virtual keyboard shown on a touch-sensitive embodiment of display 133.

As shown in FIG. 1, wear detection computer system 110 includes a one or more processors 140. Processor(s) 140 can include one or more of a central processing unit (CPU), a graphics processing unit (GPU), a field-programmable gate array (FPGA), some combination of CPU, GPU, or FPGA, or any other type of processing unit. Processor(s) 140 may have numerous arithmetic logic units (ALUs) that perform arithmetic and logical operations, as well as one or more control units (CUs) that extract instructions and stored content from processor cache memory, and then executes the instructions by calling on the ALUs, as necessary, during program execution. Processor(s) 140 may also be responsible for executing drivers and other computer-executable instructions for applications, routines, or processes stored in memory 150, which can be associated with common types of volatile (RAM) and/or nonvolatile (ROM) memory.

Wear detection computer system 110 also includes a memory 150. Memory 150 can include system memory, which may be volatile (such as RAM), non-volatile (such as ROM, flash memory, etc.) or some combination of the two. Memory 150 can further include non-transitory computer-readable media, such as volatile and nonvolatile, removable and non-removable media implemented in any method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by wear detection computer system 110.

Memory 150 stores data, including computer-executable instructions, for wear detection computer system 110 as described herein. For example, memory 150 can store one or more components of wear detection computer system 110 such as a physical parameter library 160, an image analyzer 170, a wear analyzer 175, and an alert manager 180. Memory 150 can also store additional components, modules, or other code executable by processor(s) 140 to enable operation of wear detection computer system 110. For example, memory 150 can include code related to input/output functions, software drivers, operating systems, or other components.

According to some embodiments, aspects of wear detection computer system 110 may be disposed within camera 128. For example, camera 128 may include one or more of processor(s) 140 and/or memory 150. Similarly, aspects of wear detection computer system 110 may be disposed within LiDAR sensor 126. In addition, or alternatively, aspects of wear detection computer system 110 may be disposed on work machine 100 and outside of LiDAR sensor 126 or camera 128.

Physical parameter library 160 includes physical parameter sets related to work machine 100, bucket 120, GET 125, LiDAR sensor 126 and/or camera 128. For example, physical parameter library 160 can include measurement data related to the size of bucket 120, shape of bucket 120, size of GET 125, shape of GET 125, and the spatial relationship between GET 125 and bucket 120, and/or the spatial relationship between LiDAR sensor 126 and camera 128, as just some examples. Physical parameter library 160 can also include parameters related to the size and shape of GET 125 in a new or unworn state and parameters related to the size and shape of GET 125 when they have reached maximum wear.

Physical parameter library 160 can also include templates or reference images related to the combination of bucket 120 and GET 125 (e.g., a bucket-tool template). For example, for work machine 100, one of the templates stored in physical parameter library 160 can include an image of bucket 120 with GET 125 as bucket 120 is expected to be positioned within field-of-view 127 and field-of-view 129. The bucket-tool templates can represent GET 125 that are unworn (e.g., unworn or expected edges) or GET 125 that have reached maximum wear (e.g., a threshold edge). Physical parameter library 160 can also include other information related to the wear of GET 125 to assist wear analyzer 175 in determining when GET have worn to the point of needing replacement. Wear data related to GET 125 can be in the form of actual measurement (e.g., metric or imperial dimensions) or in the form of pixel values.

As another example, physical parameter library 160 can include CAD-based models of GET 125. The CAD-based models can be models of reference GET 125 developed using computer-aided design programs such as AutoCAD®, Autodesk®, SolidWorks®, or other well-known CAD program. The CAD-based models can be used by wear detection computer system 110 as reference points to compare observed GET 125 sizes and shapes to a model, standard, or unworn GET of the same type to determine wear or loss of GET 125.

Physical parameter library 160 can include multiple physical parameter sets where each physical parameter set corresponds to a work machine, bucket, GET, or a combination of these. During operation, an operator may use operator control panel 130 to select a physical parameter set from physical parameter library 160 matching bucket 120 and GET 125, or work machine 100. For example, if the work machine 100 is a hydraulic mining shovel having a model number "6015B," the operator may use operator control panel 130 to input the model number "6015B," and wear detection computer system 110 may load into memory 150 a physical parameter set corresponding to a model 6015B hydraulic mining shovel from physical parameter library 160. In some examples, a list of templates available in physical parameter library 160 can be shown on display 133 upon a power-up or reset operation of wear detection computer system 110, and an operator may select one of the physical parameter sets from the list for operation depending on the model number of work machine 100, bucket type of bucket 120, or type of GET 125.

In some embodiments, the operator may position bucket 120 and GET 125 within field-of-view 129 of camera 128 at the beginning of a work shift and cause wear detection computer system 110 to capture an image of bucket 120 and GET 125 using an input on operator control panel 130. Wear detection computer system 110 may then perform an image matching process to match bucket 120 and GET 125 with a physical parameter set and configure itself for the wear detection and image processing processes disclosed herein based on the matching physical parameter set. In some embodiments, wear detection computer system 110 may use LiDAR sensor 126 and field-of-view 127 for this configuration process instead of camera 128 and field-of-view 129.

Image analyzer 170 can be configured to analyze imaging data captured by either LiDAR sensor 126 or camera 128 to identify GET 125 within field-of-view 127 and field-of-view 129 and to measure wear of GET 125 based on processing of that imaging data. For example, image analyzer 170 can receive stereoscopic images from camera 128 in the form of left rectified images (captured by the left image sensor of camera 128) and a right rectified image (captured by the right image sensor of camera 128). Image analyzer 170 may perform various computer vision techniques on the left rectified image and the right rectified image to identify or determine a region of interest corresponding to GET 125. As another example, image analyzer 170 may receive imaging data captured by LiDAR sensor 126 which can be used to identify a region of interest corresponding to GET 125. In the disclosed embodiments, image analyzer 170 receives data from LiDAR sensor 126 to determine wear or loss of GET 125, as described in more detail below.

Image analyzer 170 processes two sets of the imaging data when detecting wear or loss of GET 125. The first set of imaging data is captured to identify a region of interest within field-of-view 127 or field-of-view 129. The region of interest corresponds to the relative location of GET 125 within field-of-view 127 or field-of-view 129. The first set of imaging data—for detecting the region of interest—is a broad and lower resolution imaging data capture intended to locate a general region of interest for GET 125 and may be referred to as a "coarse scan." In some embodiments, the first set of imaging data can be captured using camera 128, and image analyzer 170 determines the region of interest using computer vision or machine learning techniques. In other embodiments, the first set of imaging data can be captured using LiDAR sensor 126 at a first, lower resolution (e.g., 60 degrees by 30 degrees) that is relatively wide. In some implementations, image analyzer 170 receives the first set of imaging data from both LiDAR sensor 126 and camera 128.

When image analyzer 170 identifies a region of interest corresponding to GET 125, it then controls LiDAR sensor 126 to focus on the specific region of interest to perform a higher-resolution scan, or "fine scan." For example, image analyzer 170 may communicate with the application programming interface (API) of LiDAR sensor 126 to command it to change field-of-view 127 to become narrower with a focus on the identified region of interest. LiDAR sensor 126 then performs another scan of GET 125 to collect a second set of imaging data. The second set of imaging data—having been captured by LiDAR sensor 126 with a narrower field-of-view 127—will be of higher resolution than the first imaging data captured by either LiDAR sensor 126 (when set with a wide field of view) or camera 128.

In one embodiment, after receiving the first imaging data (i.e., the lower-resolution imaging data for determining the region of interest) image analyzer 170 creates a dense stereo disparity map based on the left rectified image and the right rectified image. Image analyzer may segment the dense stereo disparity map to identify the region of interest. In addition, image analyzer 170 may also create a three-dimensional point cloud based on the dense stereo disparity map and may segment the three-dimensional point cloud to identify the region of interest.

In addition to computer vision techniques, or as an alternative to using computer vision techniques, image analyzer 170 can also employ deep learning or machine learning techniques to identify regions of interest within left rectified images and/or right rectified images captured by camera 128. For example, image analyzer 170 may use a deep learning GET detection algorithm that employs a neural network that has been trained to identify regions of interest based on a corpus of images where individual GET, groups of GET, or GET and bucket combinations have been labeled. Image analyzer 170 may also use a deep learning GET-location algorithm that employs a neural network that has been trained to locate GET within an image. The GET-location algorithm can be trained using corpus of images where individual GET have been labeled. Once the GET-location algorithm identifies individual GET within an image, it outputs the corresponding location for the GET. For example, the GET-location algorithm can output a pixel location or a bounding box output related to the location of the GET.

As noted above, once image analyzer 170 identifies the region of interest including GET 125, it commands and controls LiDAR 126 to focus field-of-view 127 on the region of interest. In some embodiments, image analyzer 170 uses spatial relationship data between LiDAR sensor 126 and camera 128 to command LiDAR sensor 126 to alter field-of-view 127 on the region of interest. Once LiDAR sensor 126 receives commands to change its field-of-view, it may alter the configuration of its MEMS (micro-electromechanical system) mirrors to narrow field-of-view 127 to capture higher-resolution imaging data related to GET 125.

From the captured higher-resolution imaging data, image analyzer 170 can create a three-dimensional point cloud corresponding to GET 125. Each point in the three-dimensional point cloud corresponds to a LiDAR "hit" or detection point captured by LiDAR sensor 126. In some embodiments, the real-life distance between the points can be as small as 1 millimeter. In embodiments with sufficiently high resolution (i.e., where the real-life distance between points is less than approximately 2.5 mm), image analyzer 170 communicates the three-dimensional point cloud data to wear analyzer 175 for wear detection analysis. In other embodiments, image analyzer 170 may perform additional processing of the three-dimensional point cloud data to further refine it for wear analysis.

For example, in some embodiments, image analyzer 170 converts the three-dimensional point cloud to a dense mesh surface. Image analyzer 170 may further convert the dense mesh surface to a sparse mesh surface before communicating the GET imaging data to wear analyzer 175. Conversion from a three-dimensional point cloud, to a dense mesh surface, then to a sparse mesh surface may be desirable to reduce computational expenditure when comparing the imaging data captured by LiDAR sensor 126 to a CAD-based GET model. Conversion from a three-dimensional point cloud, to a dense mesh surface, then to a sparse mesh surface can also filter out noise that may be present in the imaging data due to oversampling.

In some embodiments, wear analyzer 175 fuses the lower-resolution, first-received imaging data from camera 128 with the higher-resolution data, second-received imaging data received from LiDAR 126 to gain confidence in the observed measurement of GET 125. In such embodiments, image analyzer 170 performs additional processing on the left image and right image captured by camera 128. For example, once image analyzer 170 identifies the regions of interest it can further process them to create a left-edge digital image corresponding to the left rectified image and a right-edge digital image corresponding to the right rectified image. Image analyzer 170 may employ gradient magnitude search-based edge detection, but other edge detection techniques employed within the field of computer vision (e.g., zero-crossing based edge detection techniques) could be employed in other embodiments to create the left-edge digital image and the right-edge digital image.

In some examples, image analyzer 170 may refine edge estimates of GET 125 and/or identify individual GET 125 by using an expected location of GET 125 within the captured image. For example, image analyzer 170 may know the expected position of GET 125 relative to bucket 120 based on the physical parameter set stored in physical parameter library 160 corresponding to the type of bucket 120 and GET 125 in use. Using this information, image analyzer 170 can go to the expected location in selected image and capture a pixel region proximate to the teeth. The pixel region can then be used to further identify the tooth based on computer vision techniques such as application of a convolution filter, segmentation analysis, edge detection, or pixel strength/darkness analysis within the pixel region. In some embodiments, image analyzer 170 may use an individual tooth template to apply to the pixel region to further refine the location of the tooth using computer vision techniques. Image analyzer 170 may further refine edges using dynamic programming techniques. Dynamic programming techniques can include smoothing based on the strength of the edge, whether the edge is close to a hole or region of uncertainty in the dense stereo disparity map, or other edge detection optimization techniques. Image analyzer 170 can also use the output of the GET-location algorithm to gain confidence in the determining the location of the GET and to further refine edge estimates based on the output of the GET-location algorithm.

Image analyzer 170 may also create a sparse stereo disparity that is provided to wear analyzer 175 that wear analyzer 175 can use along with the higher-resolution imaging data captured by LiDAR sensor 126 to determine wear or loss in GET 125. In some embodiments, image analyzer 170 creates the sparse stereo disparity between the left-edge digital image (associated with the left rectified image) and the right-edge digital image (associated with the right rectified image), and this disparity is used by wear analyzer 175. Alternatively, the sparse stereo disparity may be calculated from a first region of interest image (associated with the left rectified image) and a second region of interest image (associated with the right rectified image) and image analyzer 170 may detect an edge from the sparse stereo disparity image.

Wear analyzer 175 can be configured to analyze the sparse stereo disparity generated by image analyzer 170 for wear. For example, the physical parameter set associated with bucket 120 and GET 125 can include expected data related to unworn GET 125 or a set of unworn GET 125 that has been calibrated based on the expected image capture of camera 128. The expected data can be in the form of pixels, actual measurement, a CAD-based model of GET 125 or an edge image related to unworn GET, as just some examples. Once wear analyzer 175 receives the sparse stereo disparity, it can fuse and correlate that sparse stereo disparity with the three-dimensional point cloud) of the higher-resolution imaging data captured by LiDAR sensor 126 (or, in some embodiments, the dense mesh surface or sparse mesh surface determined based on the three-dimensional point cloud) to determine measurement data related to the GET 125. It may then compare the determined measurement data to expected data corresponding to an unworn version of GET 125 to determine wear levels, or loss, for GET 125.

In some embodiments, pixel counts associated with the sparse stereo disparity can be used to measure the wear or loss of GET. Pixel counts can include area (e.g., total pixel for the GET), height of the GET in pixels, width of the GET in pixels, the sum of height and width of the GET, as just some examples. The manner of determining pixel counts can vary depending on the shape and style of the GET. For example, for GET that are much longer than they are wide, height pixel counts may be used, whereas for GET that are much wider than they are long, width pixel counts may be used. Various methods for determining pixel counts may be used without departing from the spirit and scope of the present disclosure.

In some embodiments, wear analyzer 175 can calculate a similarity score between the determined measurement data (which can include information derived from the higher-resolution LiDAR scan, the sparse stereo disparity determined based on the lower-resolution imagining data from camera 128, or a combination of both) and the expected data corresponding to unworn GET 125. The similarity score can reflect a measure of how well the determined measurement data of GET 125 matches the expected data of the physical parameter set. For example, the similarity score can include use of an intersection of union or Jaccard Index method of detecting similarity. In some embodiments, a dice coefficient or F1 Score method of detecting similarity can be employed to determine the similarity score. The similarity score can also include a value reflecting a percentage of how many pixels of the sparse stereo disparity overlap with the expected edge image. In some embodiments, the similarity score may be scaled or normalized from zero to one hundred.

The similarity score can provide an indication of wear of GET 125. For example, a low score (e.g., a range of 0 to 20) may indicate that one of GET 125 has broken or is missing indicating tooth loss. A high score (e.g., a range 80-100) may indicate that a tooth is in good health and needs no replacing. A score in between the low and high scores can provide a wear level for the tooth, with higher scores indicating a longer lead time for tooth replacement than a lower score.

In some embodiments, wear analyzer 175 can collect measurement data related to GET 125 over time and use the collected measurement data to determine a wear level of GET 125 and a wear trend of GET 125. For example, work machine 100 can be operating in its worksite over several days for a job. As work machine 100 moves material during the job, camera 128 provides stereo images bucket 120 and GET 125 to wear detection computer system 110, and image analyzer 170 creates sparse stereo disparities for GET 125. Wear analyzer 175 can map measurement data (e.g., pixel counts, metric measurements, imperial measurements) associated with the GET 125 at several instances of time over the period of time of the job. As bucket 120 and GET 125 engage with material at the worksite, it is expected that GET 125 will diminish in size due to wear. Accordingly, the measurement data associated with GET 125 will likewise decrease over time, and the pixel counts over time will reflect a wear trend. Wear analyzer 175 can determine a wear level for GET 125 at a particular point in time using the wear trend at the particular point in time. The wear level for GET 125 may indicate that GET 125 need replacement or it may indicate loss of one or more of GET 125. In some embodiments, measurement data associated with GET 125 can be stored in memory 150 and applied to multiple jobs and multiple worksites, and the wear trend can be applicable to the lifetime of GET 125. In such embodiments, pixel counts associated with GET 125 captured by wear analyzer 175 may be reset when bucket 120 or GET 125 are replaced, and wear analyzer 175 can restart collection of pixel counts for GET 125 from a zero-time point.

Since wear analyzer 175 determines a wear trend based on measurement data for GET 125 measured over time, wear analyzer 175 can also form predictions of when GET 125 may need replacement. For example, if wear analyzer 175 determines that measurement data associated with GET 125 show that GET 125 lose 1% of life per ten work hours (because the measurement data decreases by 1% per ten work hours), and GET 125 have been used for eight hundred work hours, wear analyzer 175 may determine that GET 125 need to be replaced within 200 hours.

In some embodiments, wear detection computer system 110 can include alert manager 180. Alert manager 180 can be in communication with wear analyzer 175 and may monitor the wear trend and wear level determined by wear analyzer 175. Alert manager 180 can provide messaging alerts to operator control panel 130 based on information determined by wear analyzer 175. For example, when the wear level reaches a wear threshold value, alert manager 180 may generate an alert that is shown on display 133 of operator control panel 130. The threshold value can correspond to values indicating extreme GET wear or, in some cases, complete GET loss. The alert may provide an indication to the operator of work machine 100 that one or more GET 125 need replacement. The wear threshold value can vary from embodiments and may dependent on the type of GET 125 and the material at the worksite with which GET 125 engage.

Alert manager 180 can also provide an alert that GET 125 may need replacement at some point in the future, for example, that GET 125 may need to be replaced within two weeks. A replacement alert can include information related to wear trend predictions for GET 125. For example, the replacement alert can include a quantification of the wear trend (e.g., GET 125 wear 2% per workday), the amount of time the teeth have been in use, or the expected date or time GET 125 will reach the wear threshold based on usage data.

In some embodiments, alert manager 180 can monitor the wear trend determined by wear analyzer 175 and provide a wear level value to display 133 to inform operator of work machine 100 of the current wear level. For example, if the wear trend indicates that GET 125 are 60% worn down, based on the wear trend, alert manager 180 may provide an indication that GET 125 have 40% of their life left before they need to be replaced. The display 133 can also inform an operator that a tooth has broken, indicating tooth loss (e.g., when one or more of GET 125 have less than 20% life).

Wear detection computer system 110 allows an operator of work machine 100 to be informed when GET 125 need replacement, or has broken, due to extensive wear. The processes employed by wear detection computer system 110—which are described in more detail below—provide for accurate and precise measurement of GET wear at a scale of less than 5 mm allowing an operator to halt operation of work machine 100 in the event of extreme GET wear or loss. The processes and techniques deployed by wear detection computer system 110 can be used with a variety of work machines.

Figure 2:
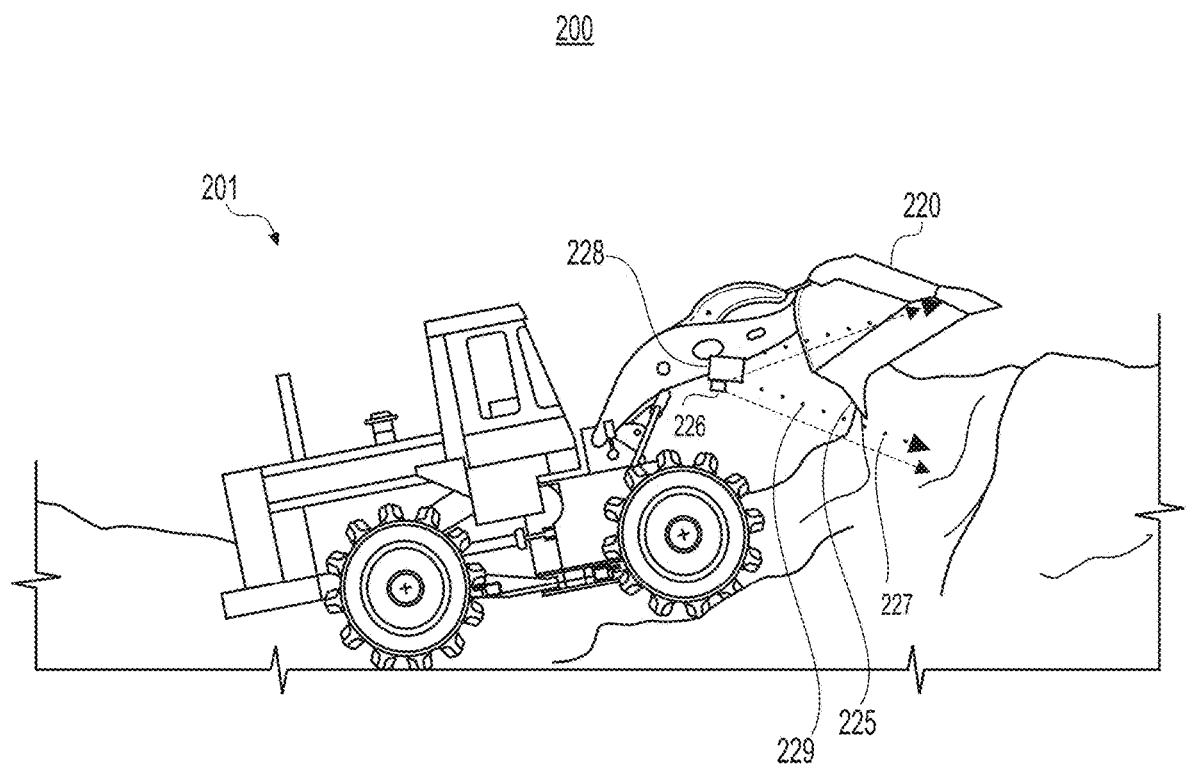
FIG. 2 is a diagram depicting a schematic side view of example environment having an example machine including an example system for detecting wear in GET.

For example, FIG. 2 is a diagram depicting a schematic side view of an example environment 200 in which a wheel loader work machine 201 is operating. Wheel loader work machine 201 can include a bucket 220 and one or more GET 225. As shown in FIG. 2, a LiDAR sensor 226 and a camera 228 are positioned so that GET 225 and bucket 220 are within a field-of-view 227 (of LiDAR sensor 226) and field-of-view 229 (of camera 228) during a dump end of the dig-dump cycle. As a result, LiDAR sensor 226 and camera 228 can be configured in such embodiments to capture imaging data when bucket 220 is at rest at the dump end of the dig-dump cycle.

Figure 3:
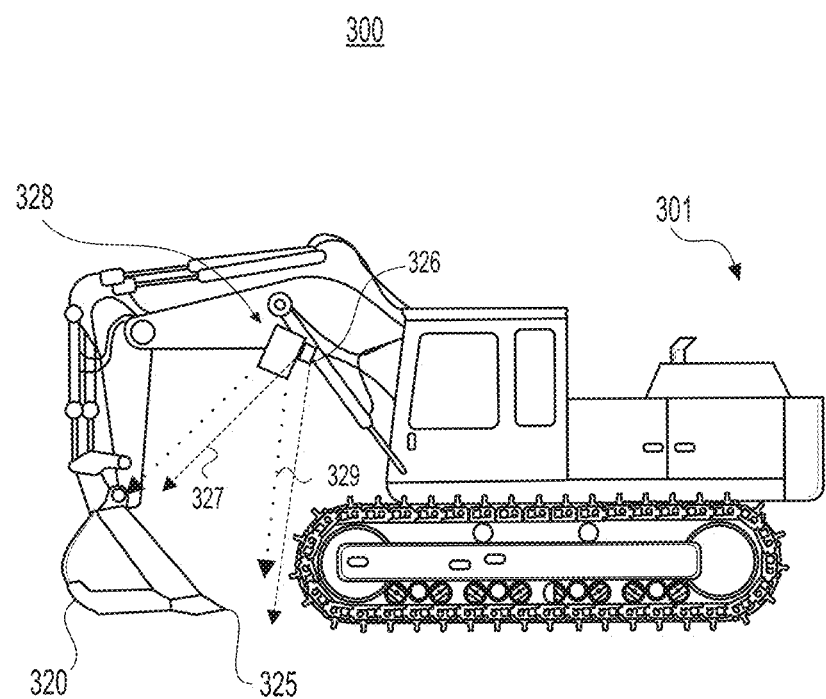
FIG. 3 is a diagram depicting a schematic side view of another example environment having an example machine including an example system for detecting wear in GET.

As another example, FIG. 3 is a diagram depicting a schematic side view of an example environment 300 in which a hydraulic mining shovel work machine 301 is operating. Hydraulic mining shovel work machine 301 can include a bucket 320 and one or more GET 325. In contrast to the positions of LiDAR sensor 226 and camera 228 for wheel loader work machine 201, a LiDAR sensor 326 and a camera 328 are positioned such that GET 325 are within a field-of-view 327 (of LiDAR sensor 326) and field-of-view 329 (of camera 328) during a dig end of the dig-dump cycle. LiDAR sensor 326 and camera 328 can be configured in such embodiments to capture imaging data when bucket 320 is at rest at the dig end of the dig-dump cycle.

Figure 4:
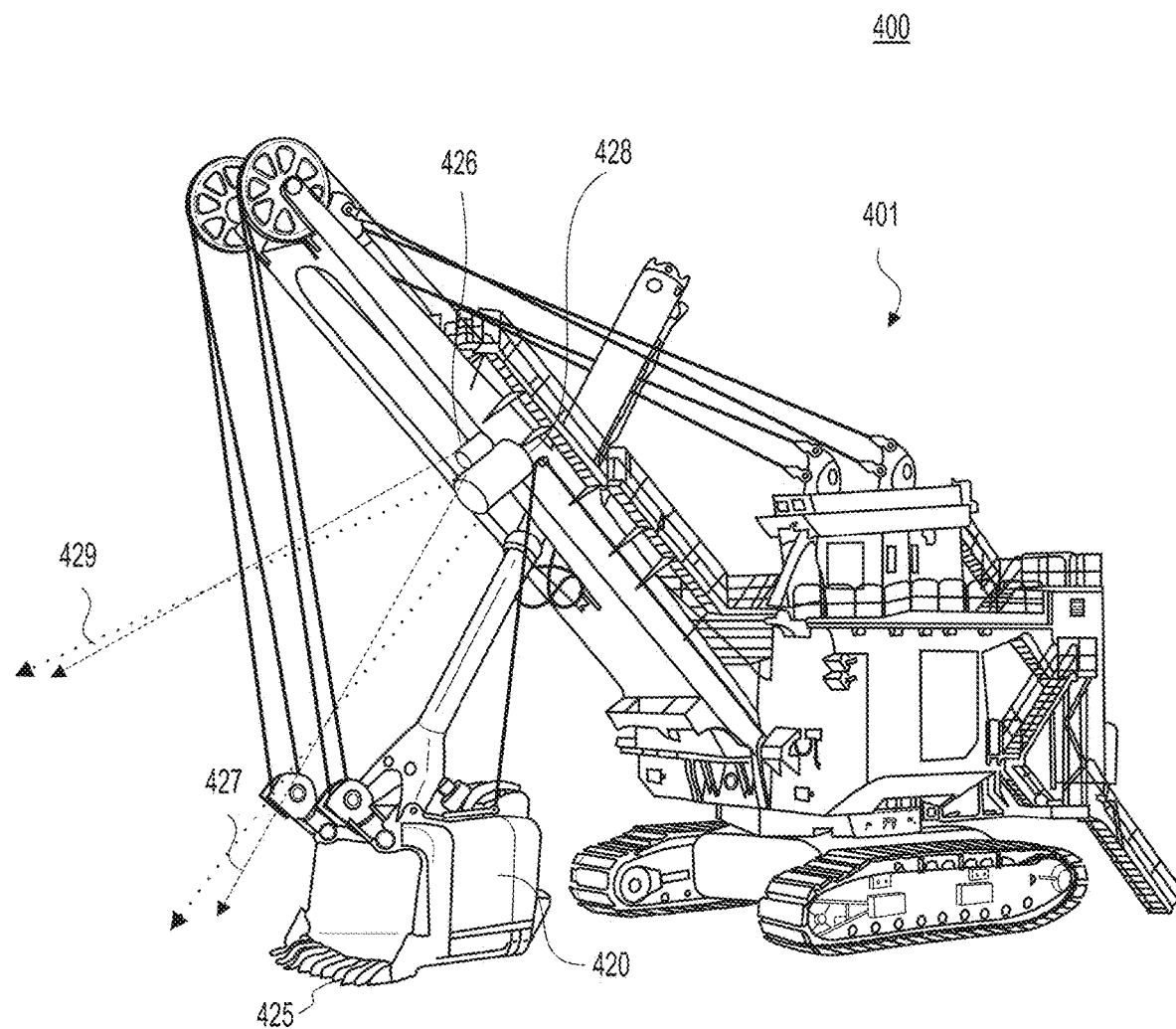
FIG. 4 is a diagram depicting a schematic side view of another example environment having an example machine including an example system for detecting wear in GET

In yet another example, FIG. 4 is a diagram depicting a schematic side view of example an environment 400 in which an electric rope shovel work machine 401 is operating. Electric rope shovel work machine 401 can include a bucket 420, one or more GET 425, a LiDAR sensor 426 and a camera 428. As shown in FIG. 4, GET 425 may be within a field-of-view 427 (of LiDAR sensor 426) and field-of-view 429 (of camera 428) at a midpoint in the dig-dump cycle, but when bucket 420 is relatively close to LiDAR sensor 426 and camera 428. In such embodiments, LiDAR sensor 426 and camera 428 can be configured to capture imaging data when bucket 420 enters a range of positions correlating to field-of-view 427 and field of view 429.

Figure 5:
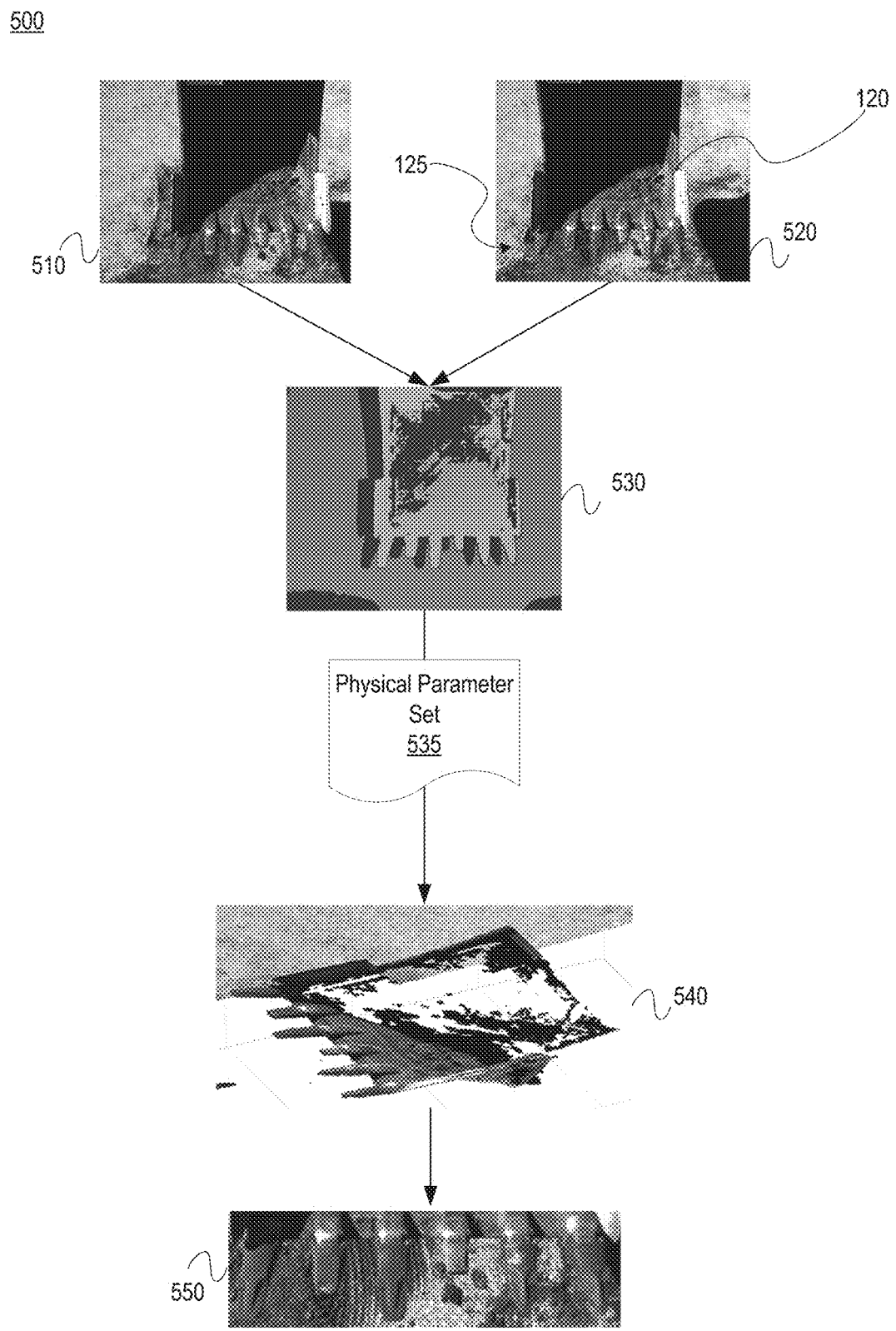
FIG. 5 is an image data flow diagram depicting an example flow of image data for a region of interest detection process using computer vision techniques.

FIG. 5 depicts an image data flow diagram 500 depicting an example flow of imaging data for a region of interest detection process using computer vision techniques. Image data flow diagram 500 includes images that are received, processed, and generated by image analyzer 170 when detecting regions of interest within imaging data captured by camera 128 related to GET 125. Image data flow diagram 500 includes a left image 510 and a right image 520 captured by camera 128. Left image 510 can be a rectified image captured by the left image sensor of camera 128. Right image 520 can be rectified image captured by the right image sensor of camera 128. Both left image 510 and right image 520 include images of bucket 120 and GET 125.

Image analyzer 170 may process left image 510 and right image 520 to create disparity map 530. Disparity map 530 can be a dense stereo disparity map showing the disparity between each pixel of left image 510 and each pixel of right image 520. Using disparity map 530 and a physical parameter set 535, obtained from physical parameter library 160 and associated with bucket 120, GET 125 and/or work machine 100, image analyzer 170 can build a three-dimensional point cloud 540. 3D point cloud 540 shows disparity between left image 510 and right image 520 in three dimensions. Image analyzer 170 may then perform a segmentation analysis on three-dimensional point cloud 540 to identify a region of interest 550 including GET 125. Image analyzer 170 may use region of interest 550 to command and control LiDAR sensor 126 to capture higher-resolution imaging data for GET 125.

Figure 6:
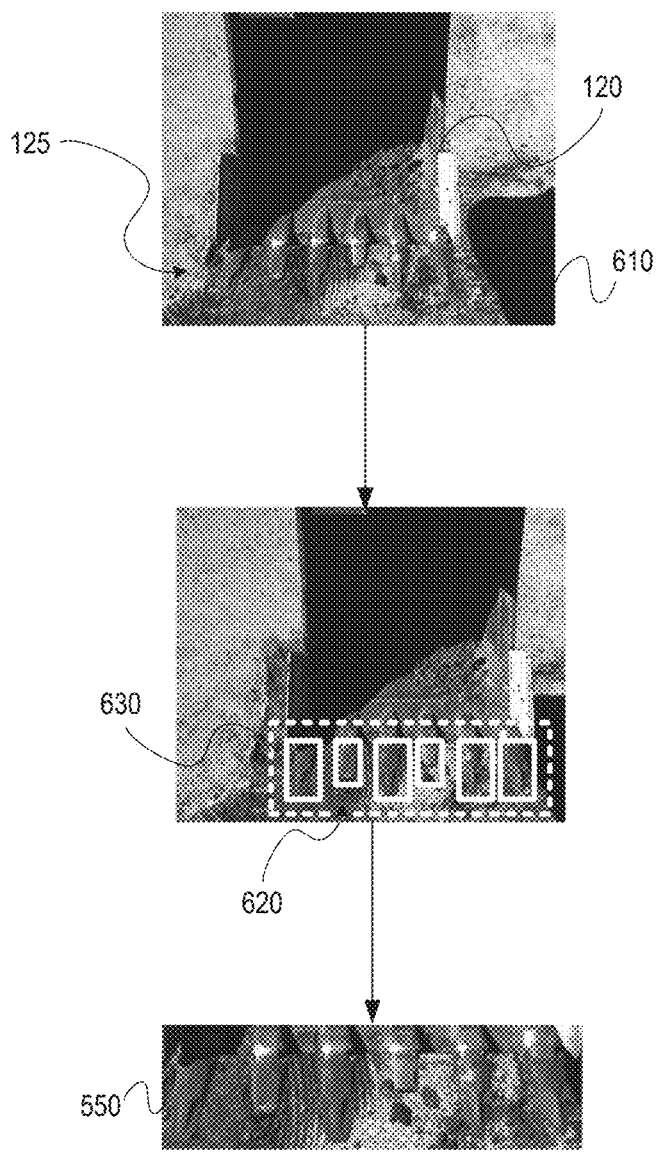
FIG. 6 is an image data flow diagram depicting an example flow of image data for a region of interest detection process using deep learning techniques.

FIG. 6 depicts an image data flow diagram 600 depicting an example flow of imaging data for a region of interest detection process using deep learning techniques. Similar to image data flow diagram 500 described above, the output of the region of interest detection process will be a region of interest 550 corresponding to GET 125 that image analyzer 170 will then use to command and control LiDAR sensor 126 to capture higher-resolution imaging data for GET 125. But unlike image data flow diagram 500, image analyzer 170 utilizes deep learning techniques to detect region of interest 550.

Image data flow diagram 600 includes image 610 captured by camera 128. Image 610 could be a rectified image captured by either the left image sensor or the right image sensor of camera 128. Image analyzer 170 may apply a deep learning GET detection algorithm to image 610. The deep learning GET detection algorithm may employ a neural network that has been trained with a corpus of image data where GET have been individually identified and labeled and/or groups of GET have been individually identified and labeled. When image analyzer 170 applies the deep learning GET detection algorithm to image 610, it may identify a plurality of individual GET bounding boxes 620 containing images of individual GET 125. In some embodiments, image analyzer 170 may also identify a GET group bounding box 630 encompassing individual GET bounding boxes 620. Once image analyzer 170 identifies GET group bounding box 630 it may extract the pixels within it as region of interest 550.

Figure 7:
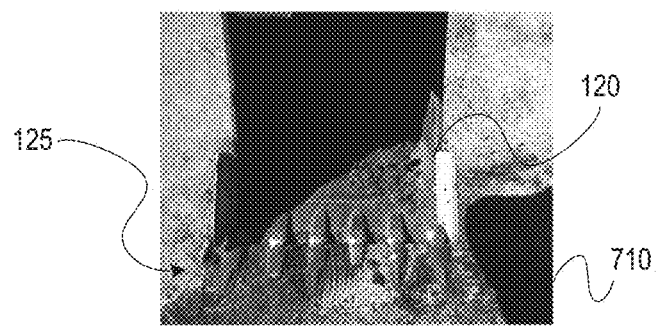
FIG. 7 is an image data flow diagram depicting an example flow of image data for a region of interest detection process using a LiDAR sensor and imaging data.
Figure 7:
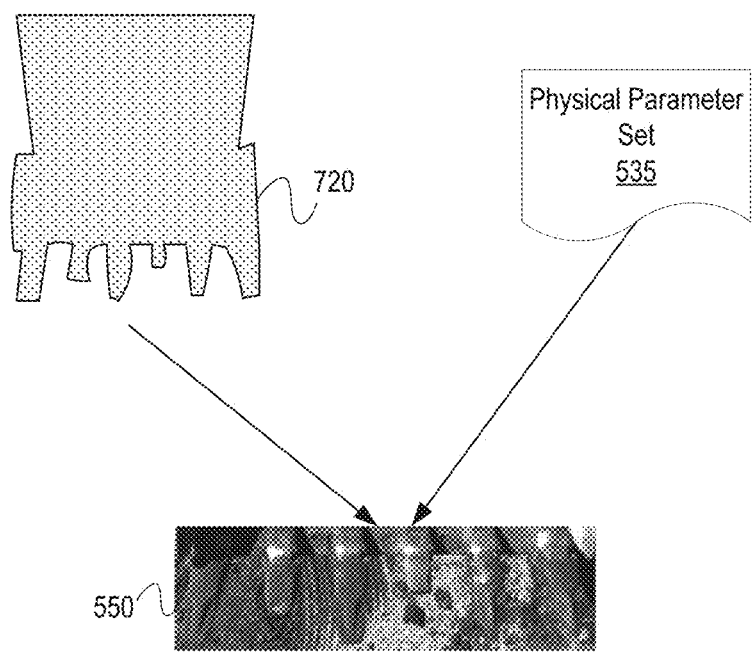

FIG. 7 depicts an image data flow diagram 700 depicting an example flow of imaging data for a region of interest detection process for imaging data captured by LiDAR sensor 126. The imaging data captured by LiDAR sensor 126 according to image data flow diagram 700 substantially corresponds to the field of view shown in image 710. As shown, the field of view includes bucket 120 and GET 125. LiDAR sensor 126 performs a LiDAR data capture that includes a plurality of LiDAR "hits" for when LiDAR sensor 126 detects an object surface, e.g., a surface corresponding to either bucket 120 or GET 125. The LiDAR hits can be represented as three-dimensional point cloud 720, where each point of three-dimensional point cloud 720 corresponds to a LiDAR hit. Image analyzer 170 determines region of interest of 510 based on three-dimensional point cloud 720 by performing a segmentation analysis or other object recognition analysis technique. In some embodiments, image analyzer 170 may use physical parameter set 535 to identify region of interest 550. For example, image analyzer 170 may use a bucket-tooth template, CAD-based model of GET 125, or pattern matching techniques to identify region of interest 550 within three-dimensional point cloud 720.

Figure 8:
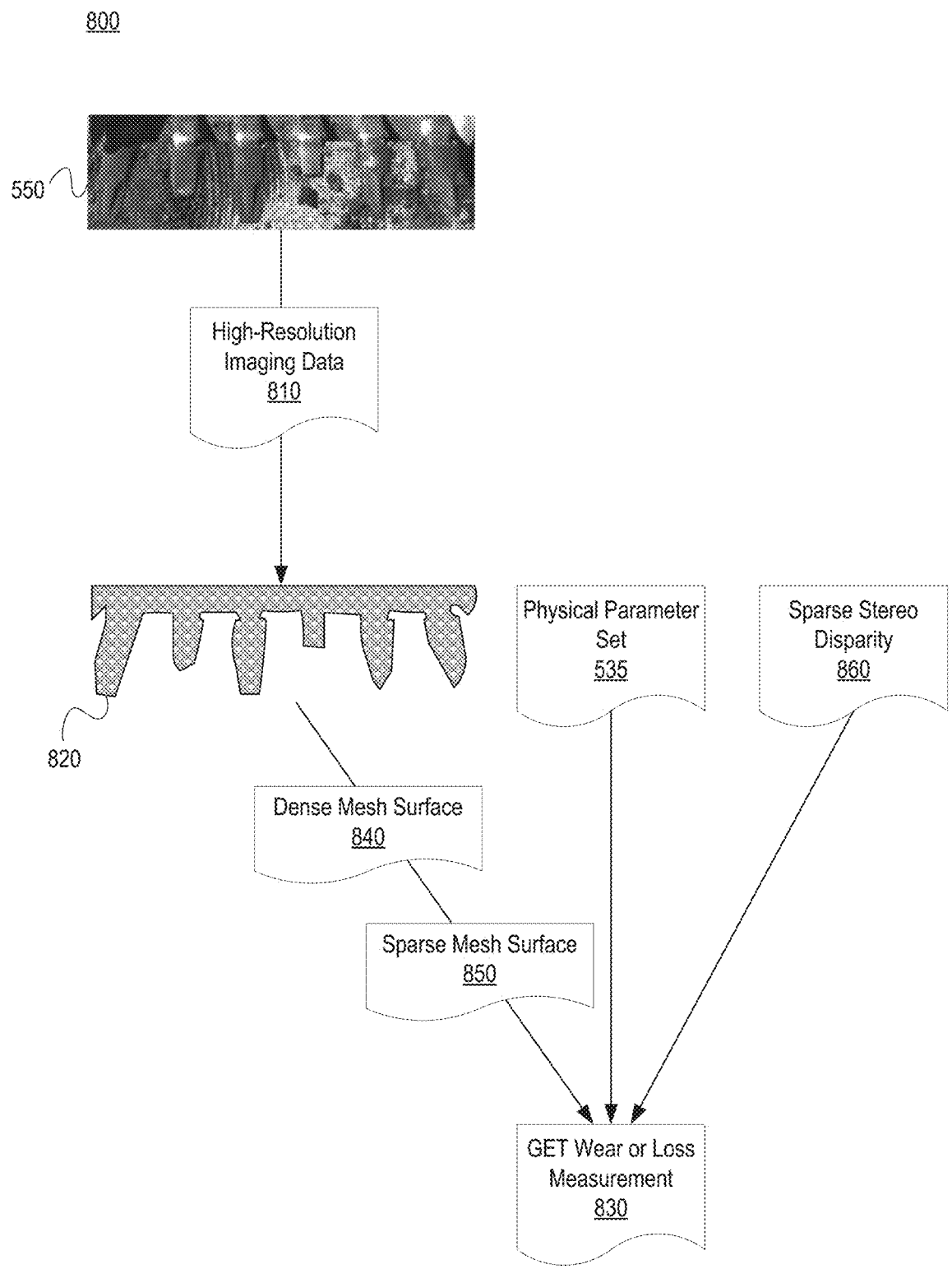
FIG. 8 is an image data flow diagram depicting an example flow of image data for a wear detection process.

FIG. 8 depicts an image data flow diagram 800 depicting an example flow of imaging data for a wear detection process using higher-resolution data captured by LiDAR sensor 126. Once image analyzer 170 identifies region of interest 550, it commands and controls LiDAR sensor 126 to perform a high-resolution scan of region of interest 550 to capture more precise data related to GET 125. LiDAR sensor 126 performs the high-resolution scan be adjusting its MEMS mirrors to narrow field-of-view 127 to capture objection recognition data limited to region of interest 550 (and, in turn, GET 125). Image analyzer 170 receives the high-resolution imaging data 810 captured by LiDAR sensor 126 and can generate a high-resolution three-dimensional point cloud 820 where each point in high-resolution three-dimensional point cloud 820 corresponds to a LiDAR hit. In some embodiments, image analyzer 170 communicates high-resolution three-dimensional point cloud 820 to wear analyzer 175 so that wear analyzer 175 can determine a GET wear or loss measurement 830 for GET 125. In some embodiments, image analyzer 170 may first convert high-resolution three-dimensional point cloud 820 to a dense mesh surface 840 or it may further convert dense mesh surface 840 to a sparse mesh surface 850 before communication to wear analyzer 175.

In some embodiments, wear analyzer 175 utilizes information in addition to the information derived from high-resolution imaging data 810 to determine GET wear or loss measurement 830. For example, in some embodiments, wear analyzer 175 uses information from physical parameter set 535, such as a CAD-based model of GET in an unworn state, as a baseline for determining GET wear or loss measurement 830. Wear analyzer 175 can also use previous GET wear or loss measurement 830 for GET 125, either instead of, or in addition to, information from physical parameter set 535. In some embodiments, wear analyzer 175 may use a sparse stereo disparity 860 for region of interest 550 generated from imaging data captured by camera 128 and fuse it with information derived from high-resolution imaging data 810 to determine GET wear or loss measurement 830.

Figure 9:
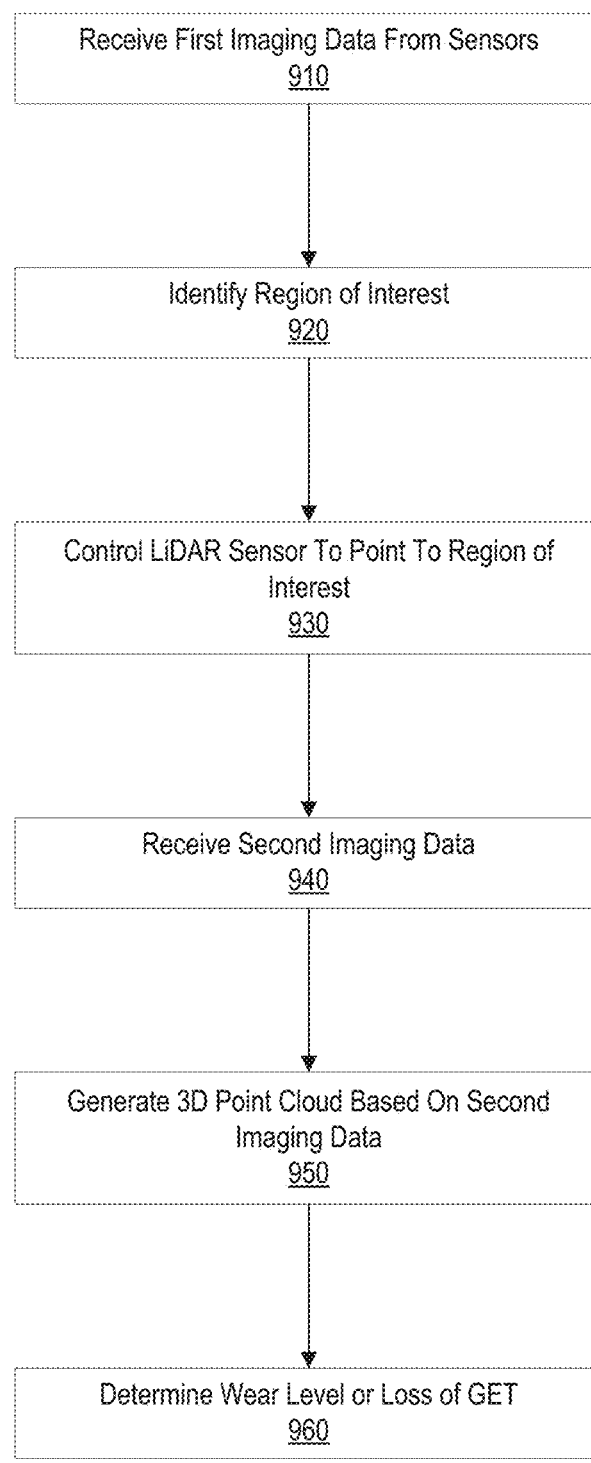
FIG. 9 is an example process for detecting wear in an example environment.

FIG. 9 shows a flowchart representing an example wear detection process 900 to detect wear of GET 125. In some embodiments, process 900 can be performed by image analyzer 170 and wear analyzer 175. Process 900 generally follows the image data flows of FIGS. 5-8 and should be interpreted consistent with the description of these figures, and the descriptions of image analyzer 170 and wear analyzer 175 described above with respect to FIG. 1. Although the following discussion describes aspects of process 900 being performed by image analyzer 170 or wear analyzer 175, other components of wear detection computer system 110 may perform one or more blocks of process 900 without departing from the spirit and scope of the present disclosure.

Process 900 begins at block 910 where image analyzer 170 receives first imaging data from one or more sensors associated with work machine 100. The one or more sensors can include LiDAR sensor 126 and camera 128, for example. The first imaging data received at block 910 generally corresponds to fields-of-view of the one or more sensors that are wide enough to capture both bucket 120 and GET 125 of work machine 100. As described in this disclosure, the first imaging data can be considered a "coarse scan" or "lower-resolution scan" of GET 125 that can be used to identify a region of interest including GET 125, at block 920.

The region of interest including GET 125 can be determined by performing a standard segmentation analysis or edge detection analysis on imaging data captured by camera 128 and comparing the results to patterns of GET or bucket and GET combinations stored in physical parameter library 160. Other computer vision techniques such as gradient analysis may be employed. The region of interest including GET 125 can also be determined by performing a depth-based segmentation on imaging data captured by LiDAR sensor 126 and likewise comparing the results to patterns of GET or bucket and GET combinations stored in physical parameter library 160. In some embodiments, image analyzer 170 may use CAD-based models of GET when determining the region of interest at block 920.

At block 930, the image analyzer 170 uses the region of interest to command and control LiDAR sensor 126 to narrow or adjust its field of view to focus on the region of interest, and by extension, the GET 125. By narrowing and redirecting its field of view, LiDAR sensor 126 is capable of capturing a high-resolution scan of GET 125. After LiDAR sensor 126 performs the high-resolution scan of GET 125, image analyzer 170 receives second imaging data from LiDAR sensor 126 at block 940. The second imaging data, having been captured by LiDAR sensor 126 with a narrower and more focused field of view, is of higher resolution than the first imaging data received at block 910.

At block 950, image analyzer 170 generates a three-dimensional point cloud based on the second imaging data. The points within the three-dimensional point cloud correspond to a LiDAR hit from the higher-resolution scan of GET 125. In some embodiments, the three-dimensional point cloud is of sufficient resolution to calculate a precise GET measurement (e.g., the hits are within two millimeters) and image analyzer 170 communicates the three-dimensional point cloud to wear analyzer 175. In some embodiments, image analyzer 170 further processes the three-dimensional point cloud by creating a dense mesh surface or a sparse mesh surface before communication to wear analyzer 175.

At block 960, wear analyzer 175 uses the information derived from the second imaging data (e.g., the higher-resolution imaging data) to determine a wear level or loss of GET. The wear level or loss may be quantified in real-world measurements (e.g., millimeters), in terms of pixels, or as a percentage of expected size (based, for example, on the CAD-based model for GET 125). As discussed above, wear analyzer 175 may use a CAD-based model of GET 125 in an unworn state and compare it to the observed GET 125 measurement to determine GET wear level or loss. Wear analyzer 175 can also use historical measurement data for GET to determine wear level over time or to determine a wear level trend to make a prediction of when GET 125 will need replacement. In some embodiments, wear analyzer 175 may be configured to determine loss when wear exceeds a threshold. For example, wear analyzer may determine loss of a GET if its size is more then 50% reduced, or reduced by a fixed measurement amount (e.g., 5 cm in length). Wear analyzer 175 may generate an alert when wear of GET meets or exceeds the threshold.

Throughout the above description, certain components of wear detection computer system 110 were described to perform certain operations. But, in some embodiments of wear detection computer system 110, other components may perform these operations other than what is described above. In addition, wear detection computer system 110 may include additional or fewer components than what is presented above in example embodiments. Those of skill in the art will appreciate that wear detection computer system 110 need not be limited to the specific embodiments disclosed above.

INDUSTRIAL APPLICABILITY

The systems and methods of this disclosure can be used in association with operation of work machines at a worksite that are excavating, moving, shaping, contouring, and/or removing material such as soil, rock, minerals, or the like. These work machines can be equipped with a bucket used to scoop, dig, or dump the material while at the worksite. The bucket can be equipped with one or more GET to assist with the loosening of the material during operation. The work machines can also include a system having a processor and memory configured to perform methods of wear detection according to the examples described herein. The systems and methods can detect wear or loss of work machine components such as GET so operators of such work machines can take corrective action before a failure damaging downstream processing equipment can occur.

In some examples, the systems and methods capture imaging data associated with GET from one or more sensors of the work machine that is then processed to determine wear or loss of the GET. The one or more sensors can include LiDAR sensors, image sensors, and/or stereoscopic cameras.

In some examples, the one or more sensors collect imaging data twice within the dig-dump cycle of the work machine. The first collection of imaging data is considered a "coarse scan" or "lower-resolution scan" of the bucket and GET. Based on the coarse scan, the systems and methods can determine a region of interest within the first imaging data. The region of interest corresponds to the group of GET (or, in some cases, an individual GET). Based on the region of interest, the systems and methods command the LiDAR sensor to focus its field of view on the GET to perform the second imaging data collection. The second imaging data collection is considered a "fine scan" or a "higher-resolution scan" of the GET.

The process described in the present disclosure provides high-precision measurements of GET while still providing processing efficiency. For example, using coarse scans of the bucket and GET allow the systems and methods to limit high resolution LiDAR scans (which are computationally expensive) to relevant objects within the field of view of the LiDAR sensor. By using the fine scans, measurement of GET within 1 or 2 millimeters can be achieved.

Moreover, use of LiDAR for fine scans (as opposed image processing or computer vision techniques) presents other advantages. For example, LiDAR-based imaging data capture can perform better than pure image-based data capture when lighting is poor, there are obstructions to cameras due to fog or inclement weather (e.g., rain or snow), when there is low contrast between the GET and excavated material, or when lighting conditions create shadows. The use of LiDAR for fine scans, therefore, can create more accurate wear detection of GET thereby decreasing the likelihood of catastrophic GET loss or wear that can cause damage to downstream processing machines.

While aspects of the present disclosure have been particularly shown and described with reference to the examples above, it will be understood by those skilled in the art that various additional embodiments may be contemplated by the modification of the disclosed devices, systems, and methods without departing from the spirit and scope of what is disclosed. Such embodiments should be understood to fall within the scope of the present disclosure as determined based upon the claims and any equivalents thereof.

What is claimed is:

1. A computer-implemented method, comprising:
receiving first imaging data from one or more sensors associated with a work machine, the one or more sensors including a left image sensor and a right image sensor of a stereoscopic camera, the first imaging data comprising:
a left image of the at least one GET captured by the left image sensor at a first resolution, and
a right image of the at least one GET captured by the right image sensor at the first resolution;
identifying a region of interest within the first imaging data, the region of interest including the data related to the at least one GET, wherein identifying the region of interest includes generating a dense stereo disparity map based on the left image and the right image;
controlling a light detection and ranging (LiDAR) sensor to capture second imaging data corresponding to the identified region of interest, the second imaging data identifying the at least one GET at a second resolution higher than the first resolution;
generating a three-dimensional point cloud of the at least one GET based on the second imaging data; and
determining a wear level or loss for the at least one GET based on the three-dimensional point cloud, the determining a wear level of loss for the at least one GET comprising:
determining a left edge in the left image corresponding to the at least one GET;
determining a right edge in the right image corresponding to the at least one GET;
determining sparse stereo disparity information based on the left edge and the right edge; and
fusing the sparse stereo disparity information with the three-dimensional point cloud.

2. The computer-implemented method of claim 1 wherein determining the wear level or loss for the at least one GET is based at least in part on a CAD-based model for the at least one GET.

3. The computer-implemented method of claim 1 wherein determining the wear level or loss for the at least one GET includes converting the three-dimensional point cloud to a sparse mesh surface, and aligning the sparse mesh surface with a CAD-based model for the at least one GET.

4. The computer-implemented method of claim 1 wherein the one or more sensors from which the first imaging data is received includes the LiDAR sensor.

5. The computer-implemented method of claim 4 wherein:
the LiDAR sensor captures the first imaging data using a first field of view,
the LiDAR sensor captures the second imaging data using a second field of view, and
the first field of view is wider than the second field of view.

6. The computer-implemented method of claim 1 wherein identifying the region of interest includes applying a deep learning GET detection algorithm to the first imaging data.

7. The computer-implemented method of claim 1 further comprising determining that the wear level or loss for the at least one GET is lower than a threshold value.

8. The computer-implemented method of claim 7 further comprising generating an alert on an operator control panel based at least in part on determining that the wear level or loss for the at least one GET is lower than the threshold value.

9. The computer-implemented method of claim 1 further comprising receiving, via an operator control panel, parameters identifying the CAD-based model for the at least one GET.

10. A system, comprising:
one or more sensors associated with a work machine, wherein at least one of the one or more sensors is a light detection and ranging (LiDAR) sensor, the one or more sensors comprising a left image sensor and a right image sensor;
one or more processors; and
non-transitory computer readable media storing executable instructions that when executed by the one or more processors cause the one or more processors to perform operations comprising:
receiving first imaging data from the one or more sensors comprising data related to at least one ground engaging tool (GET) of the work machine, the first imaging data identifying the at least one GET at a first resolution and including a left image of the at least one GET captured by the left image sensor and a right image of the at least one GET captured by the right image sensor;
identifying a region of interest within the first imaging data, the region of interest including the data related to the at least one GET, wherein identifying the region of interest includes generating a dense stereo disparity map based on the left image and the right image;
controlling the LiDAR sensor to capture second imaging data corresponding to the identified region of interest, the second imaging data identifying the at least one GET at a resolution higher than the first resolution;
generating a three-dimensional point cloud of the at least one GET based on the second imaging data; and
determining a wear level or loss for the at least one GET based on the three-dimensional point cloud, the determining a wear level of loss for the at least one GET comprising:
determining a left edge in the left image corresponding to the at least one GET,
determining a right edge in the right image corresponding to the at least one GET,
determining sparse stereo disparity information based on the left edge and the right edge, and
fusing the sparse stereo disparity information with the three-dimensional point cloud.

11. The system of claim 10 wherein determining the wear level or loss for the at least one GET is based at least in part on a CAD-based model for the at least one GET.

12. The system of claim 10 wherein determining the wear level or loss for the at least one GET includes converting the three-dimensional point cloud to a sparse mesh surface and aligning the sparse mesh surface with a CAD-Based model for the at least one GET.

13. The system of claim 10 wherein the LiDAR sensor captures the first imaging data using a first field of view and captures the second imaging data using a second field of view, wherein the first field of view is wider than the second field of view.

14. The system of claim 10 wherein identifying the region of interest includes applying a deep learning GET detection algorithm to the first imaging data.

15. The system of claim 10 wherein the operations further comprise determining that the wear level or loss for the at least one GET is lower than a threshold value.

16. The system of claim 15 wherein the operations further comprise generating an alert on an operator control panel based at least in part on determining that the wear level or loss for the at least one GET is lower than the threshold value.

17. The system of claim 10 further comprising receiving, via an operator control panel, parameters identifying the CAD-based model for the at least one GET.

18. A work machine, comprising:
   a bucket comprising at least one ground engaging tool (GET);
   a stereoscopic camera comprising:
      a left image sensor, and
      a right image sensor;
   a LiDAR sensor;
   one or more processors; and
   non-transitory computer readable media storing executable instructions that when executed by the one or more processors cause the one or more processors to perform operations comprising:
      receiving a left image of the at least one GET captured by the left image sensor;
      receiving a right image of the at least one GET captured by the right image sensor;
      generating a dense stereo disparity map based on the left image and the right image;
      identifying a region of interest based on the dense stereo disparity map;
      controlling the LiDAR sensor to capture imaging data corresponding to the identified region of interest, the imaging data capturing the at least one GET at a resolution higher than either the left image or the right image;
      generating a three-dimensional point cloud of the at least one GET based on the imaging data; and
      determining a wear level or loss for the at least one GET based on the three-dimensional point cloud, the determining a wear level or loss for the at least one GET comprising:
         determining a left edge in the left image corresponding to the at least one GET,
         determining a right edge in the right image corresponding to the at least one GET,
         determining a sparse stereo disparity information based on the left edge and the right edge, and
         fusing the sparse stereo disparity information with the three-dimensional point cloud.

19. The work machine of claim 18 wherein determining the wear level or loss for the at least one GET is based at least in part on a CAD-based model for the at least one GET.

20. The system of claim 18 further comprising an operator control panel and wherein the operations further comprise:
   determining that the wear level or loss for the at least one GET is lower than a threshold value; and
   receiving, via the operator control panel, parameters identifying the CAD-based model for the at least one GET.

* * * * *